United States Patent [19]

Jacus et al.

[11] Patent Number: 5,324,332
[45] Date of Patent: Jun. 28, 1994

[54] ALKALINE MANGANESE DIOXIDE CELLS

[75] Inventors: Robert J. Jacus, Madison; James A. Senn, Platteville, both of Wis.

[73] Assignee: Rayovac Corporation, Madison, Wis.

[21] Appl. No.: 968,896

[22] Filed: Oct. 30, 1992

[51] Int. Cl.$^5$ .............................................. H01M 6/00
[52] U.S. Cl. ..................................... 29/623.2; 29/623.4
[58] Field of Search ............. 429/185; 29/623.2, 623.4

[56] References Cited

U.S. PATENT DOCUMENTS

| | | | |
|---|---|---|---|
| 1,370,054 | 3/1921 | Schulte | 136/175 |
| 2,389,674 | 11/1945 | MacFarland | 136/175 |
| 2,605,298 | 7/1952 | Marsal | 136/107 |
| 3,318,737 | 5/1967 | Watanabe et al. | 136/133 |
| 3,364,073 | 1/1968 | Balaguer | 136/107 |
| 3,617,384 | 11/1971 | Kamai et al. | 136/30 |
| 3,740,271 | 6/1973 | Jammet et al. | 136/107 |
| 4,037,030 | 7/1977 | Sabatino | 429/139 |
| 4,075,398 | 2/1978 | Levy | 429/56 |
| 4,174,565 | 11/1979 | Kordesch | 29/623.2 |
| 4,320,182 | 3/1982 | Sugalski | 429/94 |
| 4,515,187 | 5/1985 | Schaumburg et al. | 141/1 |
| 4,654,963 | 4/1987 | Sugalski | 29/623.1 |
| 4,816,355 | 3/1989 | Kulibert et al. | 429/174 |
| 4,857,424 | 8/1989 | Larsen et al. | 429/206 |
| 4,957,827 | 9/1990 | Kordesch et al. | 429/60 |
| 5,001,024 | 3/1991 | Eberle | 429/160 |
| 5,108,852 | 4/1992 | Tomantschger et al. | 429/66 |

FOREIGN PATENT DOCUMENTS 669479 3/1989 Switzerland .

Primary Examiner—José G. Dees
Assistant Examiner—Samuel Barts
Attorney, Agent, or Firm—David R. J. Stiennon; Thomas F. Woods

[57] ABSTRACT

During repeated cycling of alkaline manganese dioxide cells, it is critical to ensure that adequate barrier protection is formed and maintained between the anode and cathode of the cell to prevent shorts from occurring between the cathode and the anode. However, the potential also exists for anodic zinc to migrate via the absorbent separator and create a short path to the cathode. To prevent this, cells can be fabricated whereby a separator barrier is placed into the cells, a hot melt sealant is metered into the cell so that the sealant flows under the separator barrier, the separator barrier is pushed down and seated into the hot melt. The end result is a separator barrier which is sealed at the bottom of the cell and at both sides of the separator barrier and virtually eliminates shorts from developing between the electrodes.

21 Claims, 2 Drawing Sheets

ALKALINE MANGANESE DIOXIDE CELLS

FIELD OF THE INVENTION

The present invention relates generally to alkaline manganese dioxide cells, and more particularly to rechargeable alkaline zinc manganese dioxide batteries having separator barriers and a meltable sealant between the anode and cathode such that the number of shorts developing between the electrodes of such cells upon repeated charge/discharge cycles is substantially reduced.

BACKGROUND OF THE INVENTION

Alkaline electrochemical cells having zinc anodes and manganese dioxide cathodes have achieved commercially success in recent years. Particularly when manufactured in the cylindrical configuration, such cells constitute important sources of portable electrical energy. Alkaline zinc manganese dioxide cells provide substantially more energy vis-a-vis Leclanche cells when used in high current continuous discharge applications.

Historically, alkaline zinc manganese dioxide cells have been used mainly in primary batteries. To date, significant reductions in battery performance after a few recharge cycles delayed the commercialization of secondary alkaline zinc manganese dioxide cells. Several principal problems contributed to this delay.

One problem endemic to such cells arises from the frequency at which they fail due to shorts developing between the metallic anode and the manganese based cathode. Shorts develop because on repeated discharge anodic zinc tends to migrate towards the cathode. Although the electrodes are separated from one another by a barrier-type separator, pathways may develop between the electrodes. For example, if the physical contact between the separator barrier and the bottom of the cell is disrupted, a short can easily develop.

In prior art cells, the seating of the separator barrier within the cell to reduce shorts between the electrodes in alkaline manganese dioxide cells was accomplished in several ways. U.S. Pat. No. 5,108,852 for a Manganese Dioxide Cathode for a Rechargeable Alkaline Cell and Cell Containing the Same, the disclosure of which is hereby incorporated by reference, discloses one such method. In this method, a plastic disc is placed in the bottom of the cell. Then a convolute separator barrier is placed on the disk and a hot melt material is metered to the inside of the separator barrier so that a seal forms only at the interior surface of the separator barrier. An example of a cell constructed in this way is depicted in FIG. 1. Battery Technologies, Inc. of Richmond Hill, Ontario, Canada has manufactured batteries having such a structure.

During repeat cycling of alkaline manganese dry cells, it is critical to ensure that adequate barrier protection is formed and maintained between the anode and cathode of the cell to prevent shorts from occurring between the cathode and the anode. With the design depicted in FIG. 1, it is possible for anodic zinc to migrate through the absorbent and over the top of the plastic disk thereby creating a shorting pathway to the cathode, as depicted in FIG. 2. Additionally, the manufacture of this type of cell involves additional steps, e.g., the disk must be constructed and then placed within the cell and the cell must be spun during metering of the hot melt.

Another method to prevent shorting is taught by Swiss Patent Application No. 669,479. Specifically directed to rechargeable alkaline zinc manganese dioxide cells, this reference utilizes a separator tube as part of a barrier system to prevent an abrupt capacity loss due to shorting experienced in cells after extended cycle life. The Swiss patent teaches three separate approaches, all using a barrier system assembled outside the cell and kept in place in the cell by a hot melt sealant. The first approach involves using a separator tube having only one open end. The closed end of separator tube is affixed to the bottom of the cell with a hot melt sealant. The second approach affixes a separator tube on a plastic disk which is affixed to the bottom of the cell with a hot melt sealant, whereas in the third approach the separator tube is bent inward before being affixed to the plastic disk.

Since the separator tubes disclosed by the Swiss patent all involve completely sealed arrangements, difficulties are encountered in obtaining a sufficient distribution of electrolyte, i.e., the appropriate electrolyte gradient between the electrodes. In order to overcome this problem, several additional manufacturing steps must be taken. Additionally, the insertion of a separator assembly into the cell further reduces the speed in which batteries can be manufactured utilizing the teachings of Swiss Patent Application No. 669,479.

Therefore, an object of the present invention is to provide a rechargeable alkaline manganese dry cell with an insulating barrier at the positive (cathode) end of the cell that completely separates the cathode and anode compartments.

Another object of the present invention is to provide continuous protection against shorting on cycled discharges in rechargeable alkaline manganese dry cells and batteries.

Yet another object of the present invention is to provide rechargeable alkaline manganese dioxide cells and batteries having a simplified overall design.

Still another object of the present invention is to provide rechargeable alkaline manganese dioxide cells and batteries that are easy to manufacture.

Other objects and advantages of the present invention will be apparent from the drawings and the description of the invention.

SUMMARY OF THE INVENTION

The present invention achieves these and other objects by placing a separator barrier into the cell, metering a hot melt sealant into the cell so that the sealant flows under the separator barrier, and pushing the separator barrier down, and seating the separator barrier into the hot melt. The end result is a sealed tube forms at the bottom of the cell. The separator barrier should be placed above the bottom of the cell.

The present invention eliminates the possibility of a short path developing between the anode and the cathode via a space between the cell bottom and a plastic disk that exists in prior art designs. Furthermore, the present invention greatly simplifies the manufacturing process, since the plastic disk is eliminated-there is no need to form or place the disk in the bottom of the cell and there is no longer any requirement to spin the cell during hot melt metering.

DETAILED DESCRIPTION OF THE PREFERRED EMBODIMENT

Figure 3:
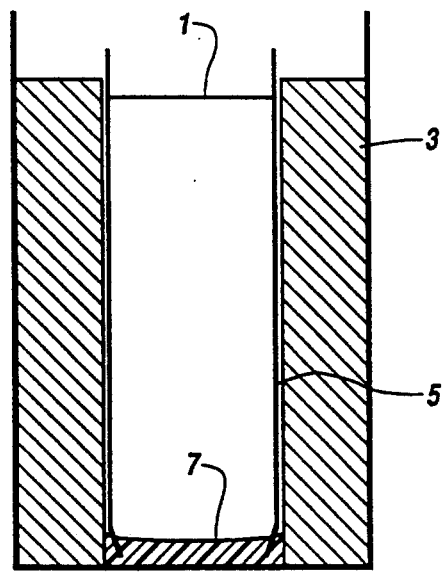
FIG. 3 illustrates a cell design of the present invention shown in cross section.

FIG. 3 depicts a cell constructed according to the present invention. The anode 1 is separated from the cathode 3 by the separator barrier 5 having an absorbent layer 6. The separator barrier 5 having an absorbent layer 6 is formed by winding material from a first roll of separator material together with material from a second roll of absorbent material onto a cylindrical mandrel of appropriate diameter such that both the absorbent material and the separator material are wound twice around the mandrel, thereby forming a convolute separator barrier. The separator barrier and the absorbent are wound together in convolute fashion so that the outside diameter of the cylindrically shaped separator barrier is less than the inner diameter of the cathode. This allows the separator barrier to be easily inserted into the central cavity during manufacturing. During and after the manufacturing process, the convolute separator barrier tends to unravel and push against the inner cathode wall, which ensures that the electrolyte functions properly since the electrolyte becomes in contact with the anode and cathode. It is to be understood that other types of separator barriers having absorbent layers or absorbent properties are contemplated in the present invention, which is not confined to separator barriers of the convolute type.

The separator barrier 5 is then placed into the cell, e.g., approximately ⅛ inch off the bottom of the cell. A hot melt type sealant 7 is then metered directly onto the bottom of the cell. In this step, hot melt type sealant No. 34/2771 manufactured by National Starch, Inc. of Bridgewater, N.J. is metered directly into the cell at a temperature of about 340° F. and at a pressure of about 200 p.s.i. The temperature range over which this sealant operates for the purposes described herein is between 300° F. and 370° F.

After a short delay, e.g., approximately one to ten seconds, which short delay depends on the viscosity and initial temperature of the hot melt sealant, while the sealant 7 is still in fluid form, the separator barrier 5 is pushed down and seated directly into the sealant 7, but does not engage the bottom of the cell. Thus, a continuous seal is formed around and under the separator barrier. Thus, hot melt sealant forms on both the outer circumference and the inner circumference of the separator barrier, as well as underneath the separator barrier. Thus, all short paths existing in prior art designs are eliminated. It is to be understood that the length of the short delay will depend on the viscosity of the sealant used, and the temperature at which the sealant is metered into the cell, however, three to five seconds has also proved advantageous.

The reason for the short delay is that the hot melt sealant cools faster at the bottom of the cell and at the surface that touches the cathode than elsewhere. Thus, when one pushes the separator barrier down into the hot melt sealant, the separator barrier will not touch the bottom of the cell because the lowest layer of hot melt sealant has already solidified.

Figure 1:
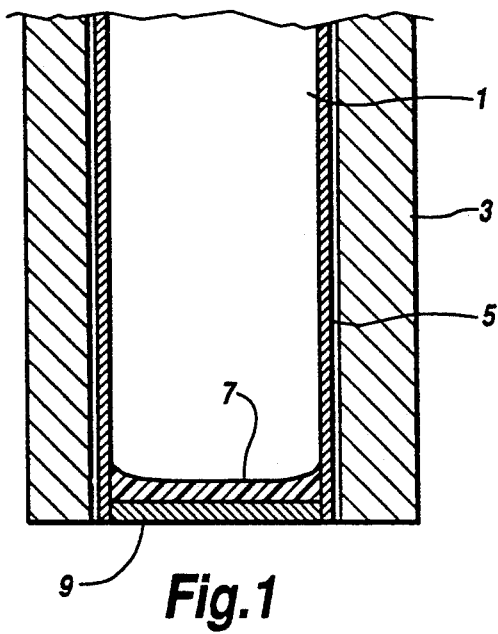
FIG. 1 depicts a prior art cell design in cross section.
Figure 2:
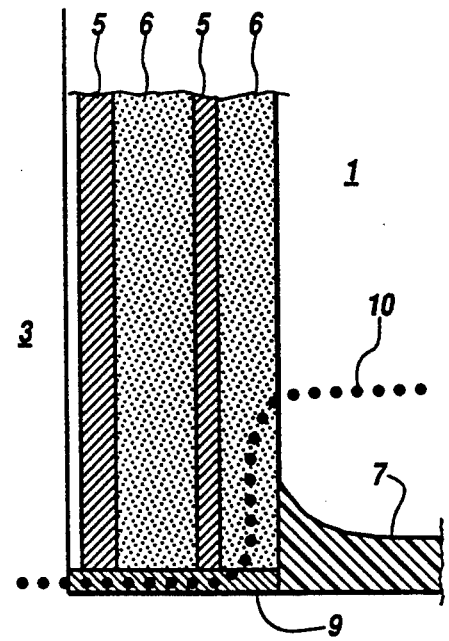
FIG. 2 depicts the short path in the prior art cell depicted in FIG. 1.
Figure 4:
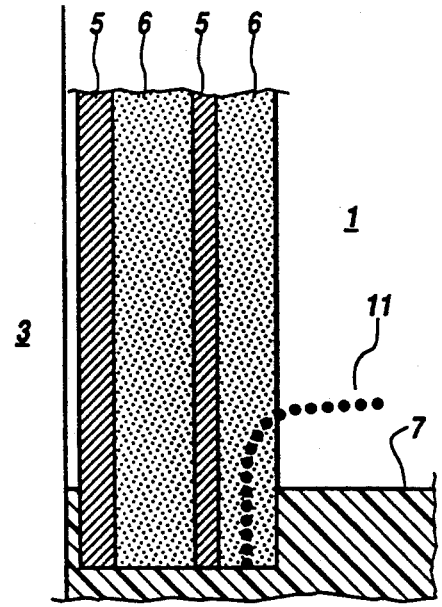
FIG. 4 depicts the blocking of the short path in the cell depicted in FIG. 3 according to the present invention.

As depicted in FIG. 2, for a cell constructed as shown in FIG. 1, with the sealant 7 applied only within the inner circumference of the separator barrier 5, anodic zinc can migrate into the porous absorbent layer 6 of the separator barrier and above the bottom disk reach the cathode. The present invention prevents this short path from developing by ensuring that hot melt exists between the exterior and the interior surfaces of the separator barrier as well as underneath the separator barrier. As depicted in FIG. 4, the sealant blocks the migration of the anodic zinc to the cathode.

The present invention also prevents short from occurring at the edges or bottom of the separator barrier. Although the separator and absorbent are wound together, they do not perfectly overlie one another. Interstitial gaps occur at the edges of the bottom of the separator barrier. When the separator barrier is pushed down into the hot melt sealant, the hot melt sealant goes up into these interstitial gaps and fills them, thus preventing shorts from occurring at these interstitial voids.

The manufacturing of the rechargeable alkaline manganese cell is significantly improved by eliminating the bottom disk described in U.S. Pat. No. 5,108,852. No forming or placing of the disk is required, and there is no longer any requirement to spin the cell during hot melt metering, as was required in the prior art. Thus, the present invention removes the possibility of shorting between the cathode and anode that was present in prior art designs, yet simultaneously reduces the complexity of the manufacturing process.

To determine the effectiveness of the short protection provided by batteries constructed according to the present invention as compared to batteries constructed according to the design illustrated in FIG. 1, cells of both designs were discharged by 300 mAhr and 600 mAhr. After being discharged by the requisite amount, the batteries were taken off load for four hours to allow shorts to develop. The batteries were then recharged for ten hours. If batteries do not have shorts between their electrodes, the charge necessary to recharge should be equal to the charge removed during discharge.

Figure 5:
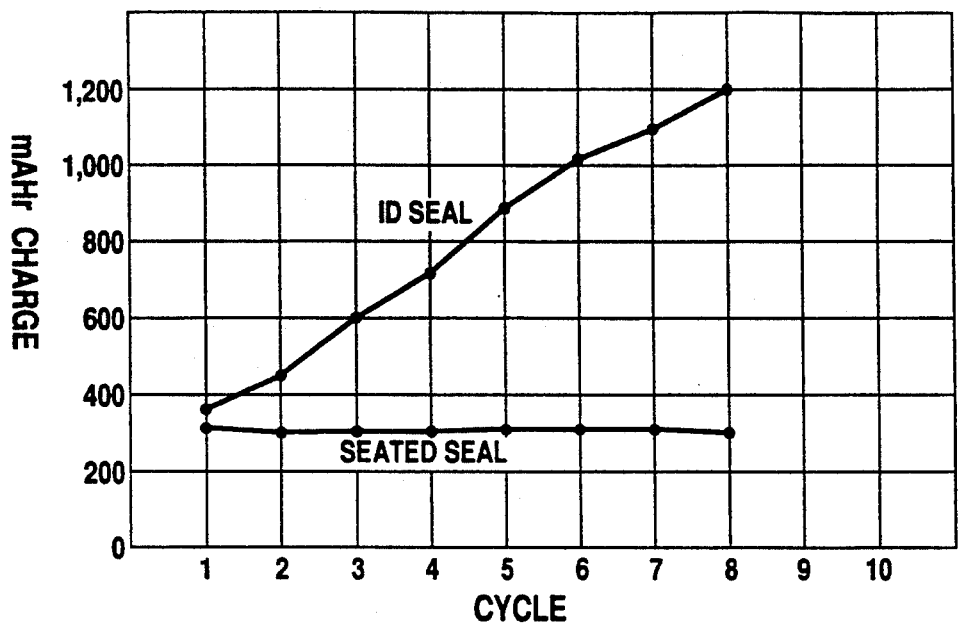
FIG. 5 depicts the test results of the amount of charge required to recharge a cell for several charge/discharge cycles when the cell was discharged by 300 mAHr, for a cell constructed according to the present invention and a cell constructed according to FIG. 1.
Figure 6:
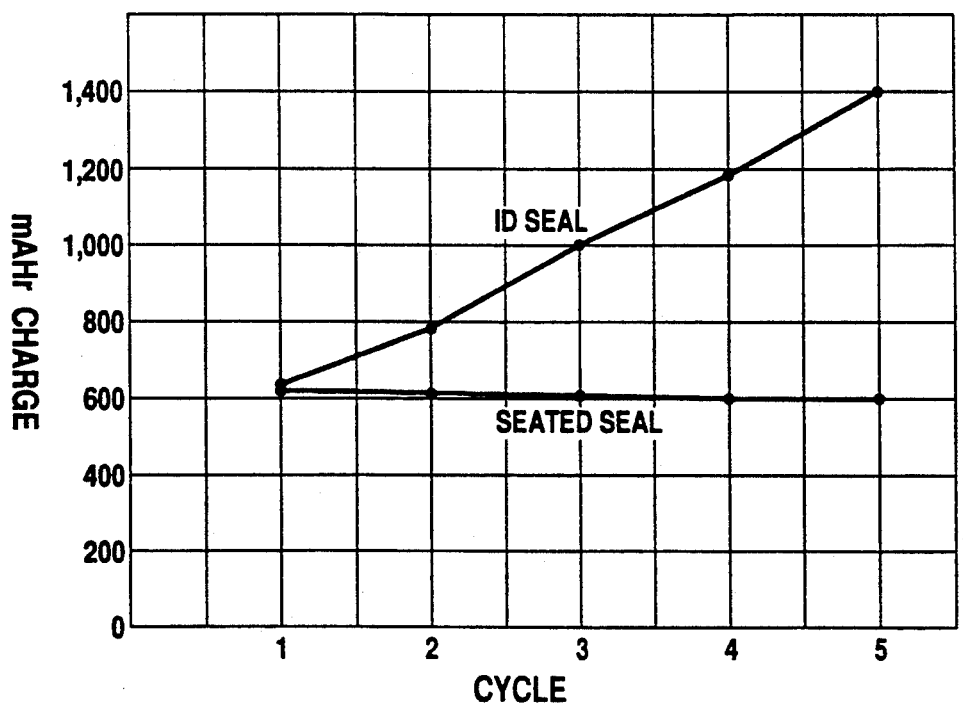
FIG. 6 depicts the test results of the amount of charge required to recharge a cell for several charge/discharge cycles when the cell was discharged by 600 mAHr, for a cell constructed according to the present invention and a cell constructed according to FIG. 1.

FIGS. 5 and 6 show the results of these discharge tests. Cells constructed according to the present invention (denoted as seated seal in FIGS. 5 and 6) required approximately the same charge as that removed during discharge, i.e., they exhibited no shorting after eight cycles when discharged by 300 mAHr, and after five cycles when discharged by 600 mAHr. In contrast, cells constructed according to FIG. 1 (denoted as ID seal in FIGS. 5 and 6) required significantly more charge that that removed during discharge under both discharge conditions, even after a few charge/discharge cycles, i.e., they exhibited evidence of significant shorting after very few cycles. For example, after only eight charge discharge cycles, the cells constructed according FIG. 1, required over four times the amount of charge than that removed during discharge, i.e., 1,200 mAHr were required to charge the cell when it had been discharged by 300 mAHr. Thus, cells constructed according to the present invention do not contain the shorts that develop in cells constructed according to the designed depicted in FIG. 1.

While the invention has been described with reference to specific embodiments, it will be apparent to those skilled in the art that many modifications and variations may be made. Accordingly, the present invention is intended to embrace all such alternatives, modifications and variations that may fall within the spirit and scope of the appended claims and equivalents thereof.

What is claimed is:

1. A method for making a battery cell having an anode and a cathode, comprising the steps of:
   a) placing a separator barrier having a bottom edge at a location propinquant to the cathode so that a space remains between the bottom edge of the separator barrier and the bottom of the cell;
   b) metering a hot melt sealant into the cell so that the hot melt sealant flows under the separator barrier and completely seals off the bottom of the cell;
   c) pausing to allow a portion of the hot melt sealant to solidify, from the bottom up; and
   d) pushing the separator barrier down into engagement with the solidified portion of the hot melt adhesive, thus seating the separator barrier into the hot melt sealant, thus forming a seal both at the exterior and the interior of the separator barrier at the bottom of the cell.

2. The method according to claim 1, wherein said hot melt sealant is metered into the bottom of the cell at a temperature between about 310° F. and 370° F.

3. The method according to claim 1, wherein said hot melt sealant is metered into the bottom of the cell at a temperature about 340° F.

4. The method according to claim 1, wherein said space is about 0.125 inches in height.

5. The method according to claim 1, wherein said the duration of the pausing step is approximately one to ten seconds.

6. The method according to claim 1, wherein said the duration of the pausing step is approximately three to five seconds.

7. The method of claim 1 wherein the separator barrier comprises at least one absorbent layer.

8. The method of claim 1 where the separator barrier is convoluted with a plurality of layers and interstitial gaps are defined between the bottom edges of the separator layers and hot melt sealant fills at least a portion of said gaps in the pushing step.

9. The method of claim 1 wherein the pushing step includes pushing the separator barrier down into the hot melt sealant to deform the separator barrier bottom edge to extend radially inwardly within the sealant, thus forming a seal which surrounds the separator barrier bottom edge.

10. A method for making a battery cell having an inner anode and an outer cathode with an inner void, a separator barrier having a bottom edge, an inner wall and an outer wall with bottom portions, wherein the separator barrier is disposed between the cathode and the anode, the method comprising the steps of:

a) placing the separator barrier within the cathode void to define a region between the bottom edge of the barrier separator and the bottom of the cell;
   b) metering a hot melt sealant inside the separator barrier and onto the bottom of the cell, the hot melt sealant flowing under the bottom edge of the separator barrier, engaging the inner wall of the cathode, occupying the region, and forming a complete seal on the bottom of the cell; and
   c) pushing the separator barrier down and seating the separator barrier into the hot melt sealant, and deforming the separator barrier bottom radially inwardly, the hot melt sealant engaging and surrounding completely the deformed bottom portions of the inner and outer walls of the separator barrier and the bottom edge of the separator barrier.

11. The method according to claim 18, wherein the pushing step occurs a short delay after the metering step.

12. The method according to claim 19, wherein the short delay is between about one to ten seconds.

13. The method according to claim 19, wherein the short delay is between about three to five seconds.

14. The method according to claim 10, wherein the pushing step occurs after the hot melt sealant has cooled where the sealant contacts the cathode and the bottom of the cell but not where the sealant contacts the separator barrier.

15. The method according to claim 18, wherein said region has a height of about 0.125 inches.

16. The method according to claim 18, wherein the metering step occurs when the hot melt sealant reaches a temperature of between about 310° F. and 370° F.

17. The method according to claim 18, wherein the metering step occurs when the hot melt sealant reaches a temperature of about 340° F.

18. A method for making a battery having an anode and a cathode and a container therefor, wherein the container has a bottom, the method comprising the steps of:
   a) placing a separator barrier having a bottom edge within the container so that a space remains between the bottom of the separator barrier and the bottom of the container;
   b) metering a hot melt sealant into the container so that the hot melt sealant flows under the separator barrier and completely seals off the bottom of the container; and
   c) pushing the separator barrier down into the hot melt sealant to deform the separator barrier bottom edge to extend radially inwardly within the sealant, thus forming a seal which surrounds the separator barrier bottom edge which is spaced above the bottom of the container.

19. The method of claim 18 wherein the separator barrier comprises at least one absorbent layer.

20. The method of claim 18 where the separator barrier is convoluted with a plurality of layers and interstitial gaps are defined between the bottom edges of the separator layers and hot melt sealant fills at least a portion of said gaps in the pushing step.

21. A method for making a battery having a container with a bottom, an inner anode, an outer cathode with an inner void, and a separator barrier having a bottom edge, an inner wall, and an outer wall with bottom portions, wherein the separator barrier is disposed between the cathode and the anode, the method comprising the steps of:
- a) placing the separator barrier within the cathode void to define a region between the bottom edge of the barrier separator and the bottom of the container;
- b) disposing a quantity of hot melt sealant into the container, the hot melt sealant flowing under the bottom edge of the separator barrier, occupying the region, and forming a seal on the bottom of the cell;
- c) pausing to allow a portion of the hot melt sealant to solidify, from the bottom up; and
- c) pushing the separator barrier down into engagement with the solidified portion of the hot melt adhesive, thus seating the separator barrier into the hot melt sealant, the hot melt sealant engaging and surrounding the inner and outer walls of the separator barrier and the bottom edge of the separator barrier.

* * * * *